US006585542B2

(12) United States Patent
Nishio et al.

(10) Patent No.: US 6,585,542 B2
(45) Date of Patent: Jul. 1, 2003

(54) CONNECTOR FOR MEMORY CARD

(75) Inventors: Atsushi Nishio, Mito (JP); Takashi Kawasaki, Mito (JP); Isao Suzuki, Mito (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/069,711

(22) PCT Filed: Jun. 28, 2001

(86) PCT No.: PCT/JP01/05582

§ 371 (c)(1),
(2), (4) Date: Feb. 27, 2002

(87) PCT Pub. No.: WO02/03506

PCT Pub. Date: Jan. 10, 2002

(65) Prior Publication Data

US 2002/0115350 A1 Aug. 22, 2002

(30) Foreign Application Priority Data

Jun. 30, 2000 (JP) ........................................ 2000-199695

(51) Int. Cl.[7] .............................................. H01R 24/00
(52) U.S. Cl. ....................... 439/630; 439/159; 439/345
(58) Field of Search ............................... 439/630, 328, 439/159, 160, 310, 333, 345, 327; 361/798, 754

(56) References Cited

U.S. PATENT DOCUMENTS 4,887,188 A   12/1989  Yoshida et al.
5,036,430 A * 7/1991  Hills ........................... 361/684
5,740,012 A * 4/1998  Choi ........................... 361/685
5,890,920 A * 4/1999  David et al. ................. 439/157
5,967,810 A * 10/1999 Spickler et al. ............. 439/159
6,270,365 B1 * 8/2001  Nishioka ..................... 439/159
6,382,995 B1 * 5/2002  Bricaud et al. ............. 439/159
6,398,567 B1 * 6/2002  Nishimura .................. 439/159

FOREIGN PATENT DOCUMENTS

JP       634088     1/1988
JP      6316585     1/1988
JP      1166476     6/1989
JP     10255905     9/1998
JP     10320511    12/1998

* cited by examiner

Primary Examiner—P. Austin Bradley
Assistant Examiner—Edwin A. León
(74) Attorney, Agent, or Firm—Ladas & Parry

(57) ABSTRACT

A connector 11 for a memory card includes a housing 12, a plate 14, a guide plate 16, a lock mechanism 18, and a connector pin keeping part 20. When a memory card 24 is inserted in the full-lock position, a connector pin 28 of the memory card 24 contacts a contacting part 40d of a connector pin 40 so as to press the contacting part 40d of the connector pin 40 downward. Thus, a reading and writing of data available a loading operation of the memory card 24. At this time, after a lock member 56 of the lock mechanism 18 moved in the inserting direction while fitting in the concavity 32 of the memory card 24, the memory card 24 is prevented from being pulled out since the lock member 56 of the lock mechanism 18 is restricted from the moving in the lock releasing direction by a restriction part 14o of the plate 14.

4 Claims, 18 Drawing Sheets

BEFORE INSERTION OF MEMORY CARD

CONNECTOR FOR MEMORY CARD

TECHNICAL FIELD

The present invention relates to a connector for a memory card in which a memory card is inserted.

BACKGROUND ART

A development of a memory card in which a semiconductor memory (RAM) is built, for example, such as a recording medium memorizing a plurality of image data taken by a digital camera or a recording medium memorizing a plurality of musical digital data being played on portable musical player has been progressing.

This type of the memory card includes the semiconductor memory (RAM) inside a package formed with an external appearance of a thin plate shape and a plurality of electrically connected connectors juxtaposed to a tip of the package.

Also, the memory card is formed in a predetermined size and shape depending on each type. Therefore, it is required that a connector for the memory card corresponding to the size and shape of the memory card to be used is fixed on a digital camera and a portable music player.

The conventional connector for a memory card is constituted to press-hold the side of a memory card by an internal pressing mechanism when a memory card is inserted so as to have a composition that can pull the memory card out. Also when a shock is applied from outside, there is a possibility that a memory card inserted in a card holder jumps out.

Thus, a cover closing a card insertion opening through which a memory card is inserted is provided so as to prevent the inserted memory card from jumping out of the card holder.

However, in the conventional connector for a memory card, it is required that the cover preventing the memory card from jumping out of the card insertion opening is provided because the inserted memory card can not be kept securely.

Therefore, it is difficult to be miniaturized the conventional connector due to a shutter being provided separately from the connector, and also there is a problem that a manufacturing cost becomes high because of an increase in the number of components.

Thus, it is an object of the present invention to provide a connector for a memory card that engages the inserted memory card with the connector and is constituted to manufacture cheaply.

DISCLOSURE OF INVENTION

According to the present invention, when a memory card is inserted at the loaded position where an end of the memory card is brought into contact with a contacting terminal formed inside a card holder, a restriction member directly contacts a press member fitting in a concavity formed on the side surface of the memory card so as to restrict the press member from deforming outwardly, so that the memory card inserted in the card holder can be kept securely. Also, the connector for a memory card can achieve a simplification of the structure by reducing a number of components because there is no need to provide a separate part that prevent the memory card from jumping out.

Also, when a memory card is inserted in an insertion part, the press member moves to a side of the insertion part so as to permit an insertion of the memory card and also guide an inserting operation by pushing a side surface of the memory card, thereby achieving a smooth inserting operation of the memory card without a jolt.

Also, according to the present invention, the press member is made from a board spring, an engagement part is fitted in a concavity formed on a side surface of the memory card by elastic deformation of an arm due to an inserting operation of the memory card, and the memory card moves in the insert direction with a slider member, so that the memory card can be positively engaged at the loaded position by preventing the press member from moving in a state where the memory card is loaded at the loaded position.

Also, according to the present invention, when the memory card is inserted in the insertion part with wrong direction, the engagement part of the press member directly contacts a side tip of the inserted memory card and the engagement part slides in the insert direction, thereby the engagement part is prevented from moving in the insert direction, so that the insertion of the memory card in the wrong direction can be prevented without increasing a number of components.

BEST MODE FOR CARRYING OUT THE INVENTION

A description will now be given of a connector for a memory card according to a mode for carrying out the present invention.

Figure 1:
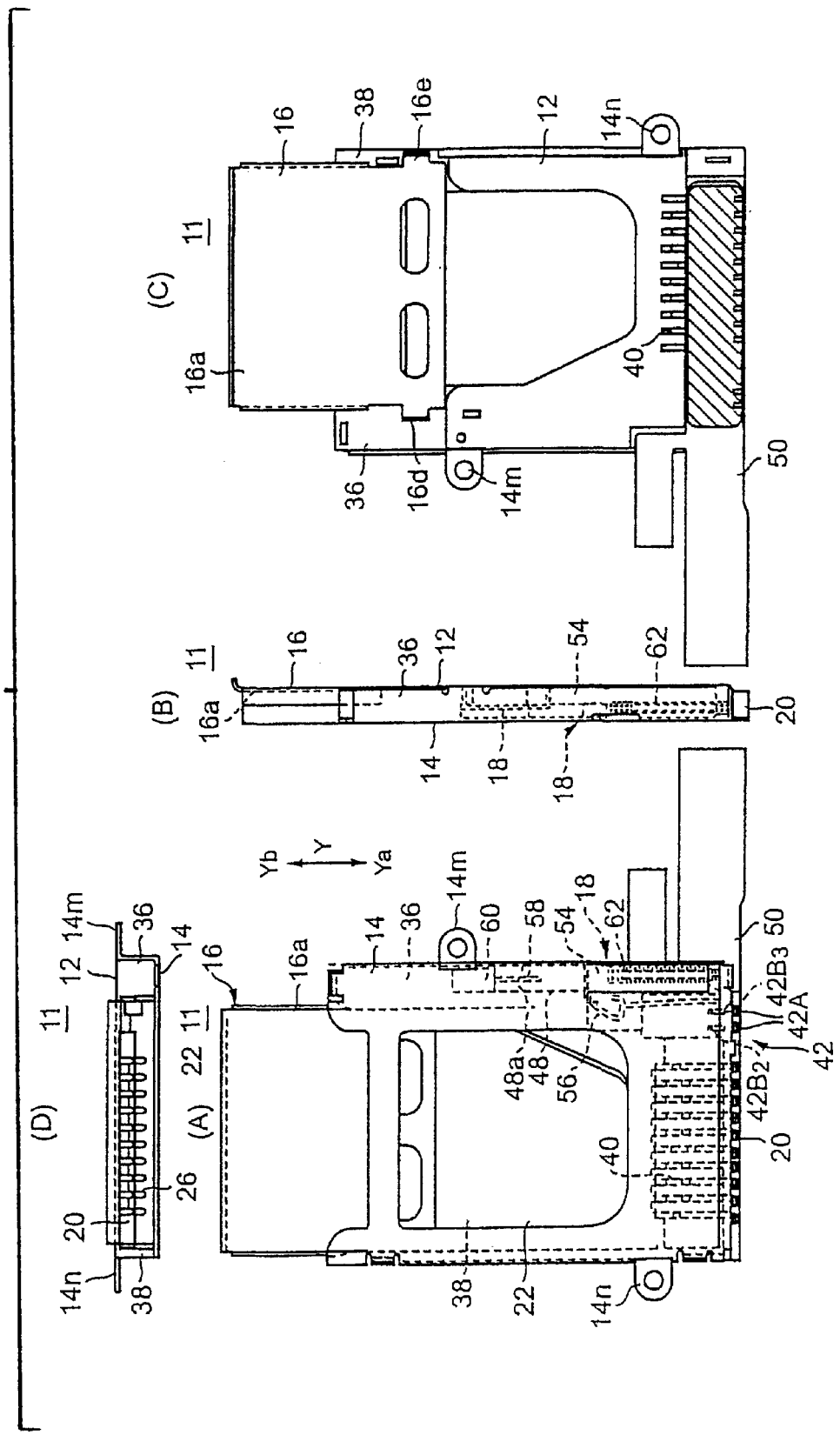
FIG. 1 is a view that shows one embodiment of a connector for a memory card of the present invention, and (A) is a plan view of a connector for a memory card, (B) is a side view of the connector for a memory card, (C) is a bottom plan view of the connector for a memory card, and (D) is a rear view of the connector for a memory card.

FIG. 1 is a view that shows one embodiment of a connector for a memory card of the present invention, and (A) is a plan view of a connector for a memory card, (B) is a side view of the connector for a memory card, (C) is a bottom plan view of the connector for a memory card, and (D) is a rear view of the connector for a memory card.

As shown in FIGS. 1(A) through (D), the connector 11 for a memory card comprises a housing 12, a plate 14 being fixed facing to the housing 12, a guide plate 16 being fixed on the housing 12 and guiding an insertion of a memory card, a lock mechanism 18 that locks an inserted memory card, and the connector pin keeping part 20 provided at the rear side of the housing 12.

Also, the connector 11 for a memory card has an insertion part 22 formed by the housing 12 and the plate 14. Then, once the memory card 24, which is described below, is inserted into the insertion part 22, the memory card 24 will be locked by the lock mechanism 18 in a state of being electrically connected with connector pins (a contact terminal) 40 of the connector pin keeping part 20.

For the connector 11 for a memory card, writing or reading a plurality of data of the memory card 24 is conducted in such a structural state as described above. Also, when taking the memory card 24 out of the connector for a memory card, the memory card 24 is ejected by a release of a locking means of the lock mechanism 18 achieved by pressing the memory card 24 again.

In this way, in the connector 11 for a memory card, when the memory card 24 is placed at predetermined position, there is no need to provide separately a cover for preventing the memory card 24 from jumping out because the lock mechanism 18, which locks the memory card 24, is built in, so that the number of manufactured parts is reduced and a simplified structure results.

Figure 2:
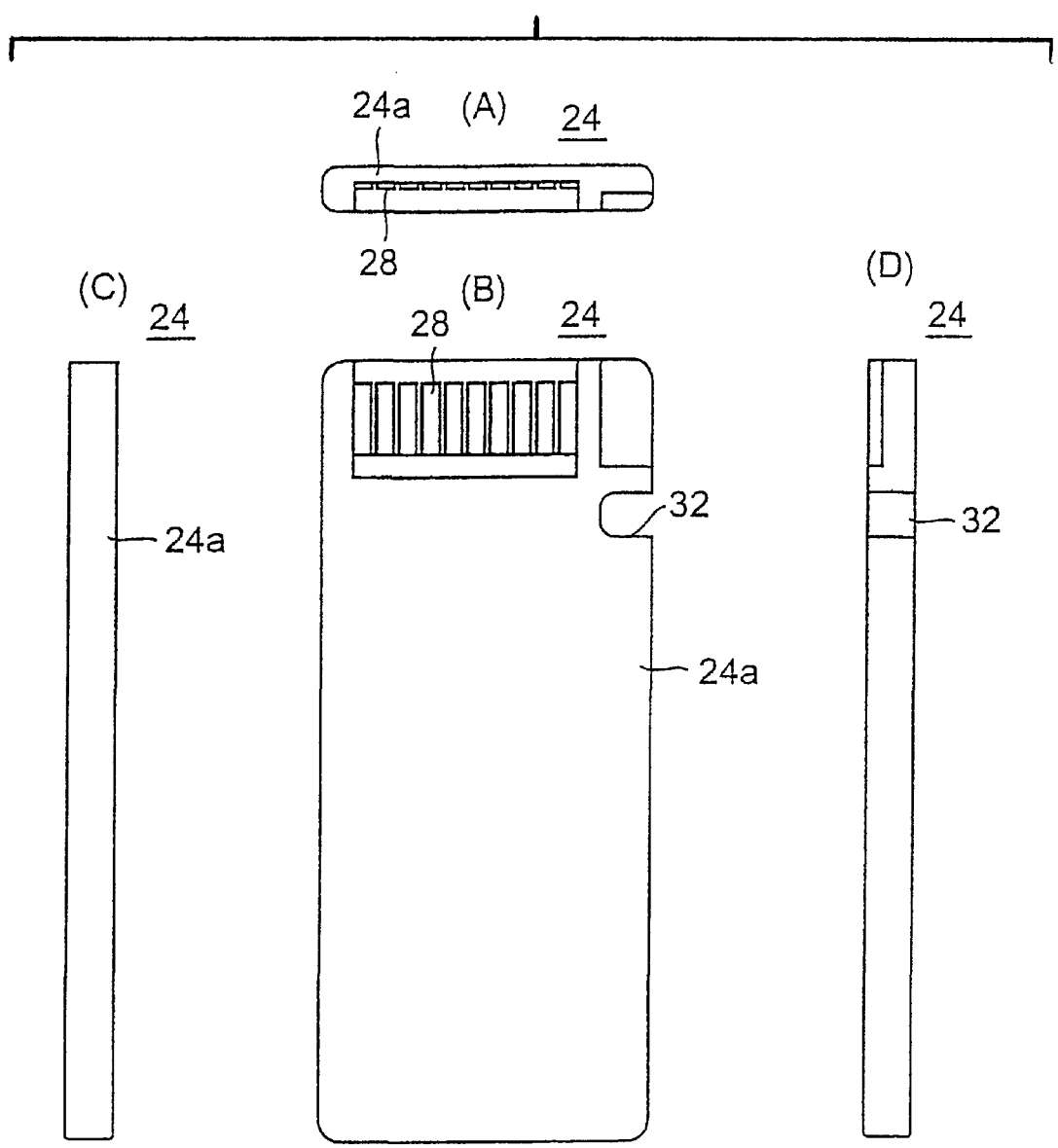
FIG. 2 is a view that shows a structure of a memory card 24, (A) is a front view of a memory card 24, (B) is a bottom plan view of the memory card 24, (C) is a left side view of the memory card 24, and (D) is a right side view of the memory card 24.

FIG. 2 is a view that shows a structure of a memory card 24, (A) is a front view of a memory card 24, (B) is a bottom plan view of the memory card 24, (C) is a left side view of the memory card 24, and (D) is a right side view of the memory card 24.

As shown in FIGS. 2(A) through (D), in the memory card 24, a semiconductor memory is built inside of a thin plated case 24a and 9 pins of a connector pin 28 are fixed at a front edge of the case 24a.

Also, a concavity 32 for engaging the lock mechanism 18 is provided at a right front side of the case 24a.

Figure 3:
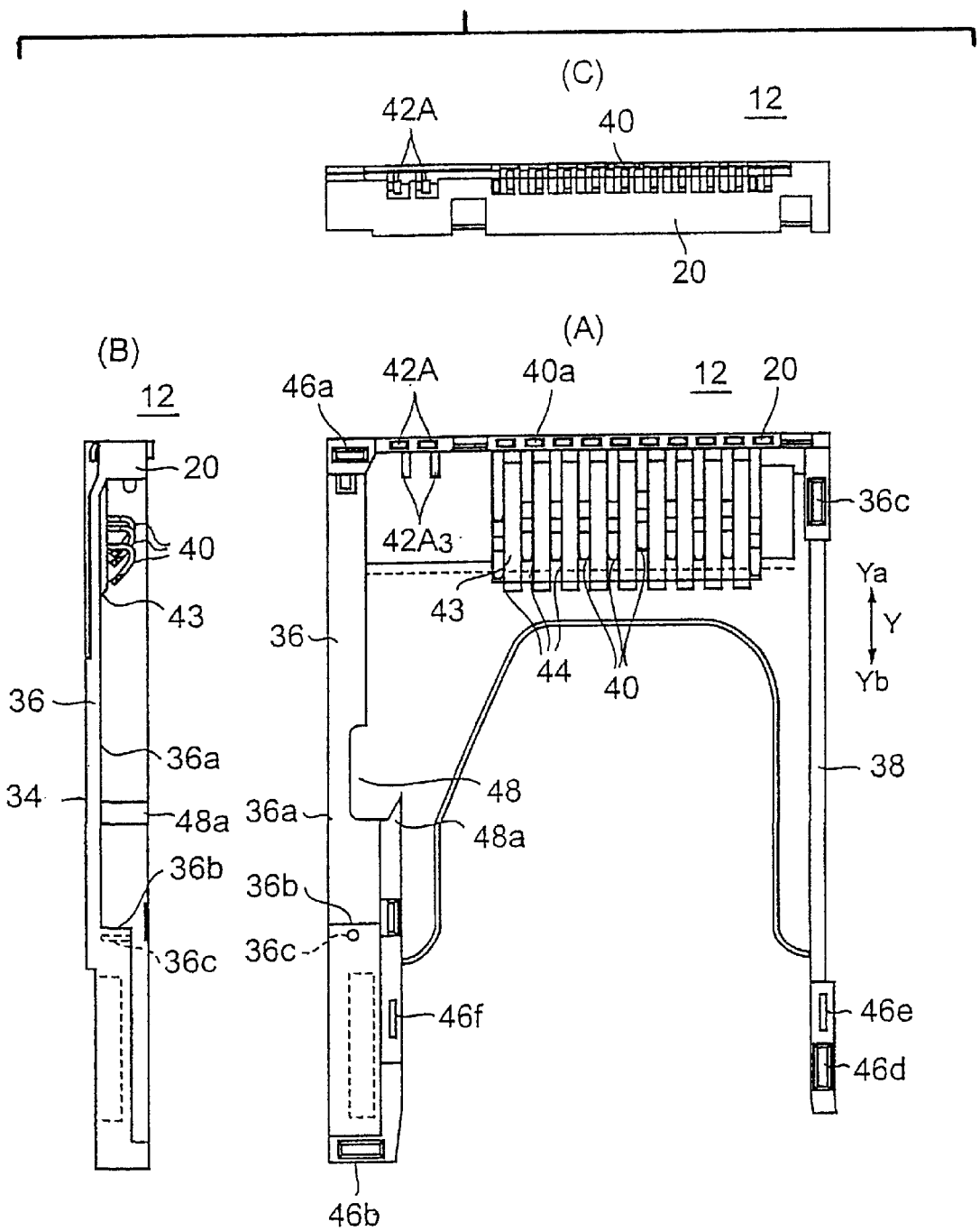
FIG. 3 is a view that shows a structure of a housing 12, (A) is a plan view, (B) is a side view, and (C) is a rear view.
Figure 4:
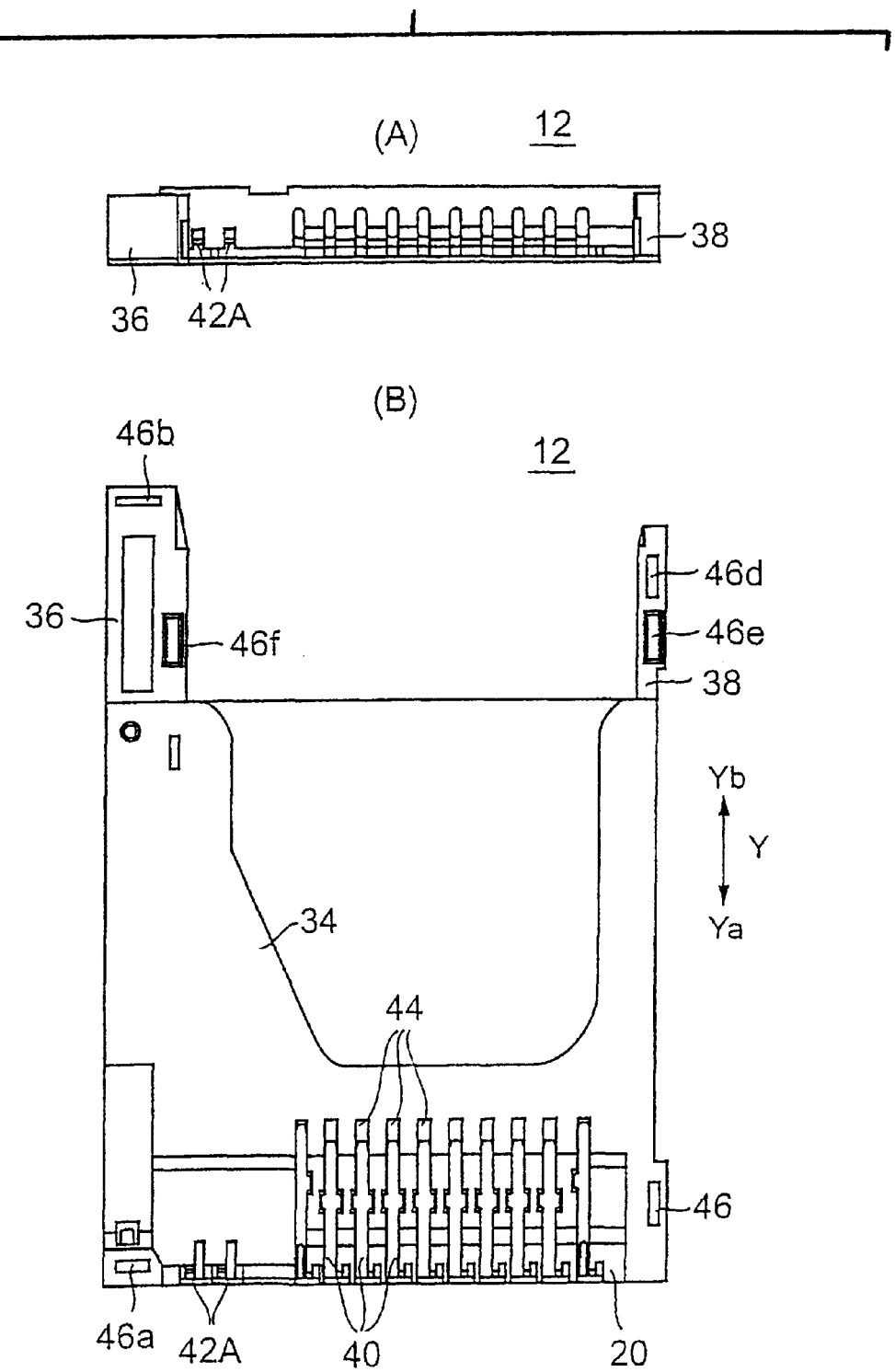
FIG. 4 is a view that shows a structure of the housing 12, (A) is a front view, and (B) is a bottom plan view.

FIG. 3 is a view that shows a structure of a housing 12, (A) is a plan view, (B) is a side view, and (C) is a rear view. Also, FIG. 4 is a view that shows a structure of the housing 12, (A) is a front view, and (B) is a bottom plan view.

As shown in FIGS. 3(A) through (C), and FIGS. 4(A) and (B), the housing 12 is formed as a whole with synthetic resin material, and has the connector pin keeping part 20 horizontally bridged at the rear of the insertion part 22 as facing to an edge of the memory card 24, a bottom 34 that provides a bottom surface on which the memory card 24 slides, a left side 36 facing to a left side of the memory card 24 and a right side 38 facing to a right side of the memory card 24.

The connector pins 40 formed extended in an eject direction (Yb direction) are press-fitted into the connector pin keeping part 20 so as to contact with the connector pins 28 of the memory card 24. Also, in the connector pin keeping part 20, the fixed section 42A of the eject operation detection switch 42 for detecting an ejection operation of the memory card 24 is provided parallel to the connector pins 40.

Furthermore, when a memory card 12 is inserted in a wrong direction, a step 43, which prevents a wrong insertion of the memory card 12, is formed so as to protrude on the bottom surface 34 of the housing 12. In addition, the above mentioned connector pins 40 are inserted inside slots 44 formed on the step 43 in a comb shape.

Also, stopper holes 46a–46d for press-fitting the stopper part (not shown here) of the plate 14 are provided at both edges of a front and a rear direction of the left side part 36 and the right side part 38 of the housing 12. Also, stopper holes 46e and 46f for stopping the guide plate 16 are provided on the left side part 36 and the right side part 38 of the housing 12. Thus, the plate 14 is assembled in a state in which the plate 14 is attached at the left side part 36 and the right side part 38 and faces to the bottom surface 34 of the housing 12.

Also, a concavity 48 for receiving the lock mechanism 18 is provided at the left side part 36, and a stopper part 48a for stopping a lock member, which is described below, protrudes at an edge of the concavity 48.

In addition, the left side part 36a has a sliding surface 36a, on which a slider 54 of the lock mechanism 18 described below with a insert operation and an eject operation of the memory card 24, slides in Y directions, and a step 36b formed on the left side part 36 functions as a stopper by contacting the slider 54 when the slider 54 slides in the eject direction (Yb direction). Also, a fitting hole 36c that an edge part of a lock pin 58, which is described below, fits into is provided on an upper surface of the left side part 36a. Moreover, the lock pin 58 is fixed around the fitting hole 36c with an ability to slide, locks the slider 54 at the insert position, or operates to release the lock of the slider 54 when moving back to the eject position.

Here, the connector pin 40 and the connector pin keeping part 20 will be explained.

Figure 5:
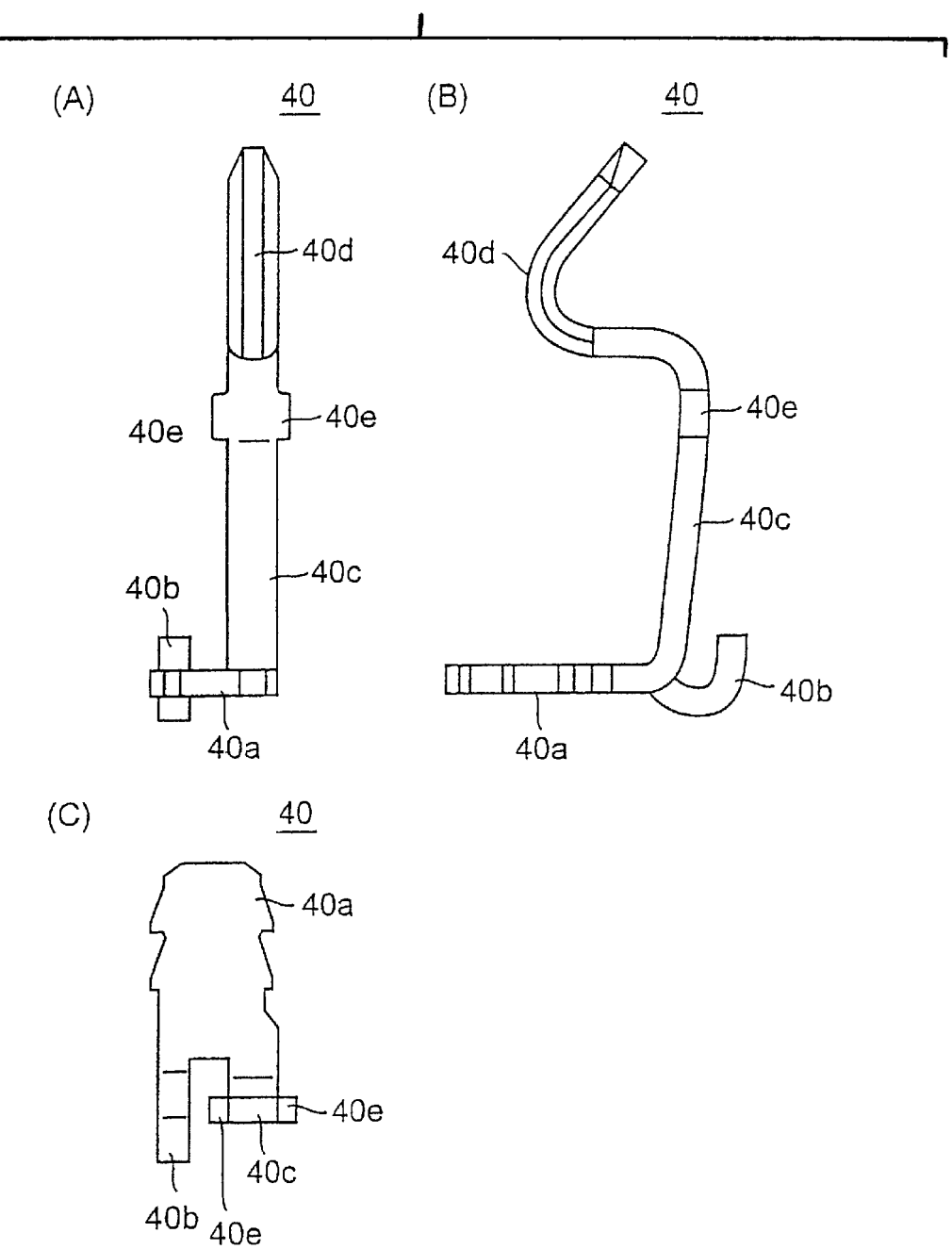
FIG. 5 is a view that shows a structure of a connector pin 40, (A) is a plan view of the connector pin 40, (B) is a side view of the connector pin 40, and (C) is a rear view of the connector pin 40.
Figure 6:
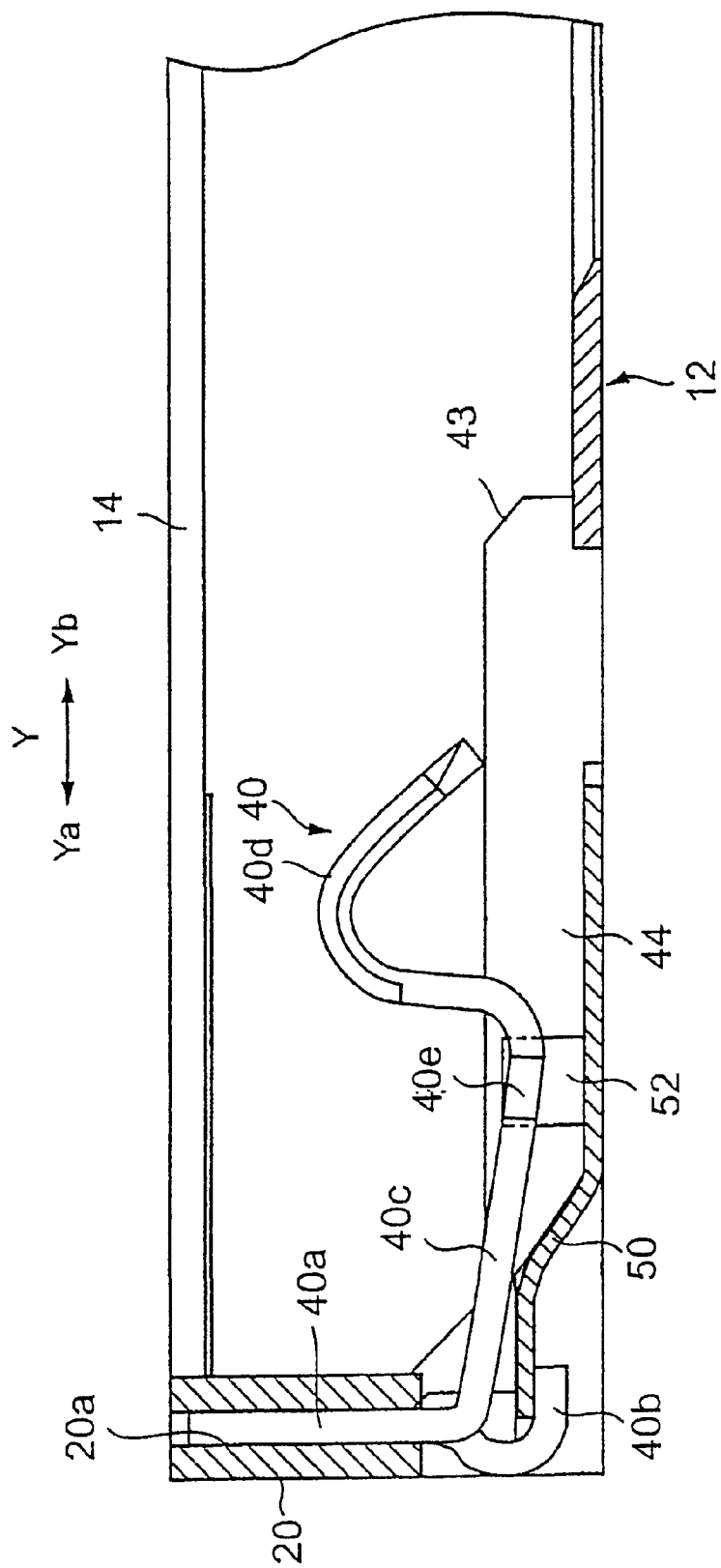
FIG. 6 is a vertical section side view of a state in which the connector pin 40 is fixed to a connector pin keeping part 20.

FIG. 5 is a view that shows a structure of a connector pin 40, (A) is a plan view of the connector pin 40, (B) is a side view of the connector pin 40, and (C) is a rear view of the connector pin 40. Also, FIG. 6 is a vertical section side view of a state that the connector pin 40 is fixed to a connector pin keeping part 20.

As shown in FIGS. 5(A) through (C) and FIG. 6, the connector pin 40 has a press-fitting part 40a being press-fitted into a fixing hole 20a penetrating to up-down direction (thickness direction) of the connector pin keeping part 20, a substrate connector 40b provided at a lower edge of the press-fitting part 40a with an U-shape, an arm 40c extending in the horizontal direction by bending substantially perpendicular from the lower edge of the press-fitting part 40a, a contact part 40d to be manufactured as bending fishhook-shaped, which is bent from a front edge of the arm 40c upward, then further bending downward to be declining and a stopper part 40e contacting with an edge of the slit 44 as protruded to both sides of the arm 40c. That is, one part of an edge (the press-fitting part 40a) of the connector pin 40 is extended in the up-down direction and press-fitted into the fixing hole 20a, the other edge (the arm 40c) is extending in the horizontal direction contacting with the connector pin 28 of the memory card 24.

The press-fitting part 40a is formed with a saw tooth-shape so that a plurality of protruding parts being protruded as triangle structures being press-fitted into the fixing hole 20a from which it would be hard to escape are formed sequentially. Also, after the substrate connector 40b is soldered to a flexible line plate 50, because the substrate connector 40b is bent and manufactured to be small and be U-shaped with a curve, the flexible line plate 50 is kept between the bottom of the housing 12 and the substrate connector 40b. Also, the stopper part 40e protruding to both sides of the arm 40c is fitted into a concavity 52 formed on a bottom of an inner wall of the slot 44 so as to remain at a predetermined height where the contact part 40d can easily make contact with the connector pin 28 of the memory card 24.

As described above, because the connector pin keeping part 20 is formed as to be horizontally bridged to a rear face of the housing 12 and the press-fitting part 40a of the connector pin 40 is press-fitted in a perpendicular state, the connector 11 for a memory card can be miniaturized and realized a reduced thickness by restricting an amount of protruding to a rear side within a small volume. Therefore, because a shape of the connector pin 40 is bent like a L-shape and the fixing hole 20a of the connector pin keeping part 20 is extended in an up-down direction and formed in the housing 12, it can promote the miniaturization and reduced thickness of the connector 11 for a memory card. As a result, reducing a weight of the connector 11 for a memory card can also be attained.

Here, a structure of the eject operation detecting switch 42 will be explained.

The eject operation detecting switch 42 comprises the fixed section 42A to be kept at the connector pin 20 and the mobile section 42B to be kept at the slider described below.

Figure 7:
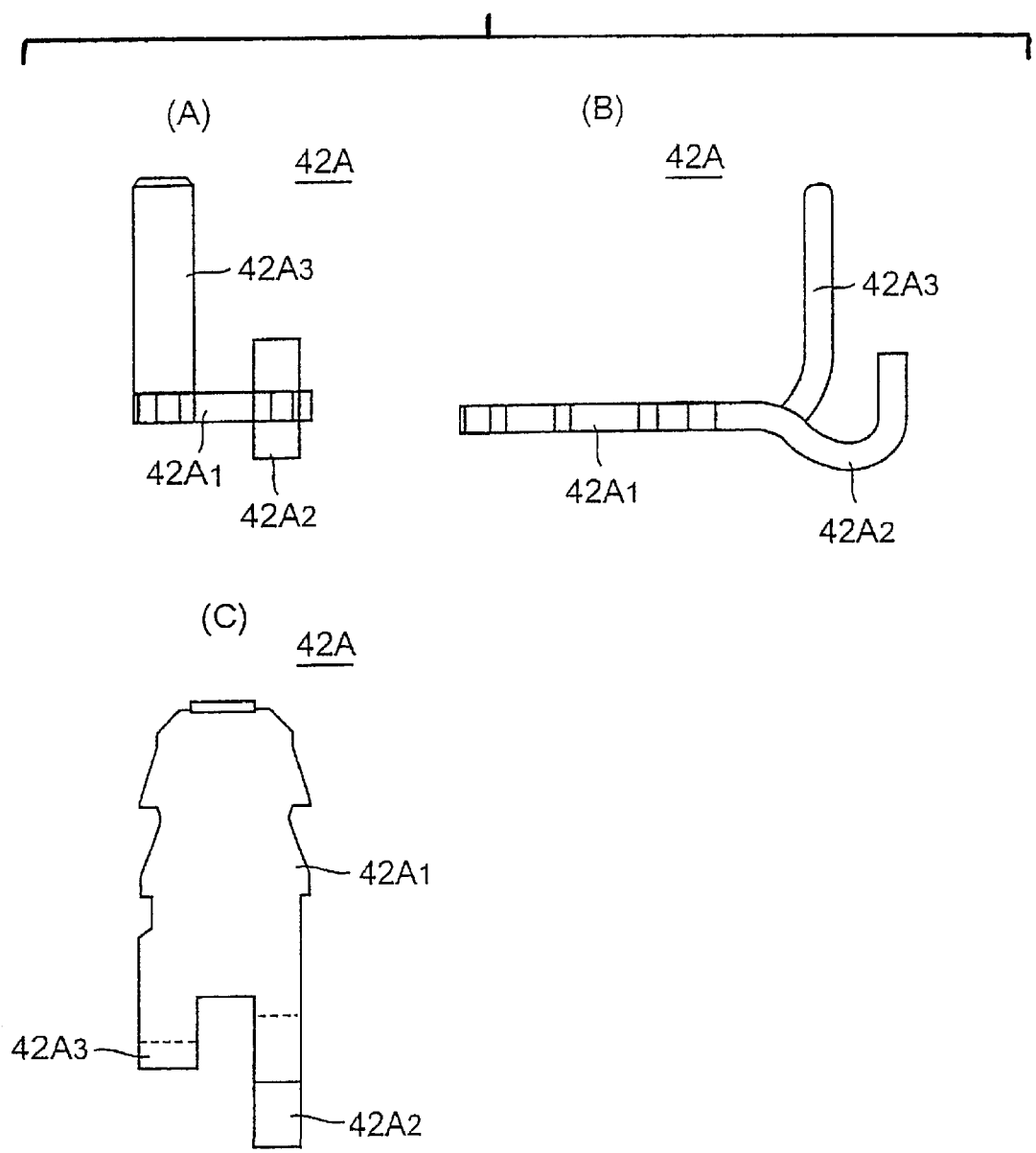
FIG. 7 is a view that shows a structure of a fixed section 42A of an eject operation detecting switch 42, (A) is a plan view of the fixed section 42A, (B) is a side view of the fixed section 42A, and (C) is a rear view of the fixed section 42A.

FIG. 7 is a view that shows a structure of a fixed section 42A of an eject operation detecting switch 42, (A) is a plan view of the fixed section 42A, (B) is a side view of the fixed section 42A, and (C) is a rear view of the fixed section 42A.

As shown in FIGS. 7(A) through (C), the fixed section 42a has a press-fitting part $42A_1$ to be press-fitted into the fixing hole 20a being provided on the connector pin keeping part 20, a substrate connector part $42A_2$ provided at a lower edge of the press-fitting part $42A_1$ with a U-shape and a contact part $42A_3$ extending in the horizontal direction then bending to substantially perpendicular from the lower edge of the press-fitting part $42A_1$.

Figure 8:
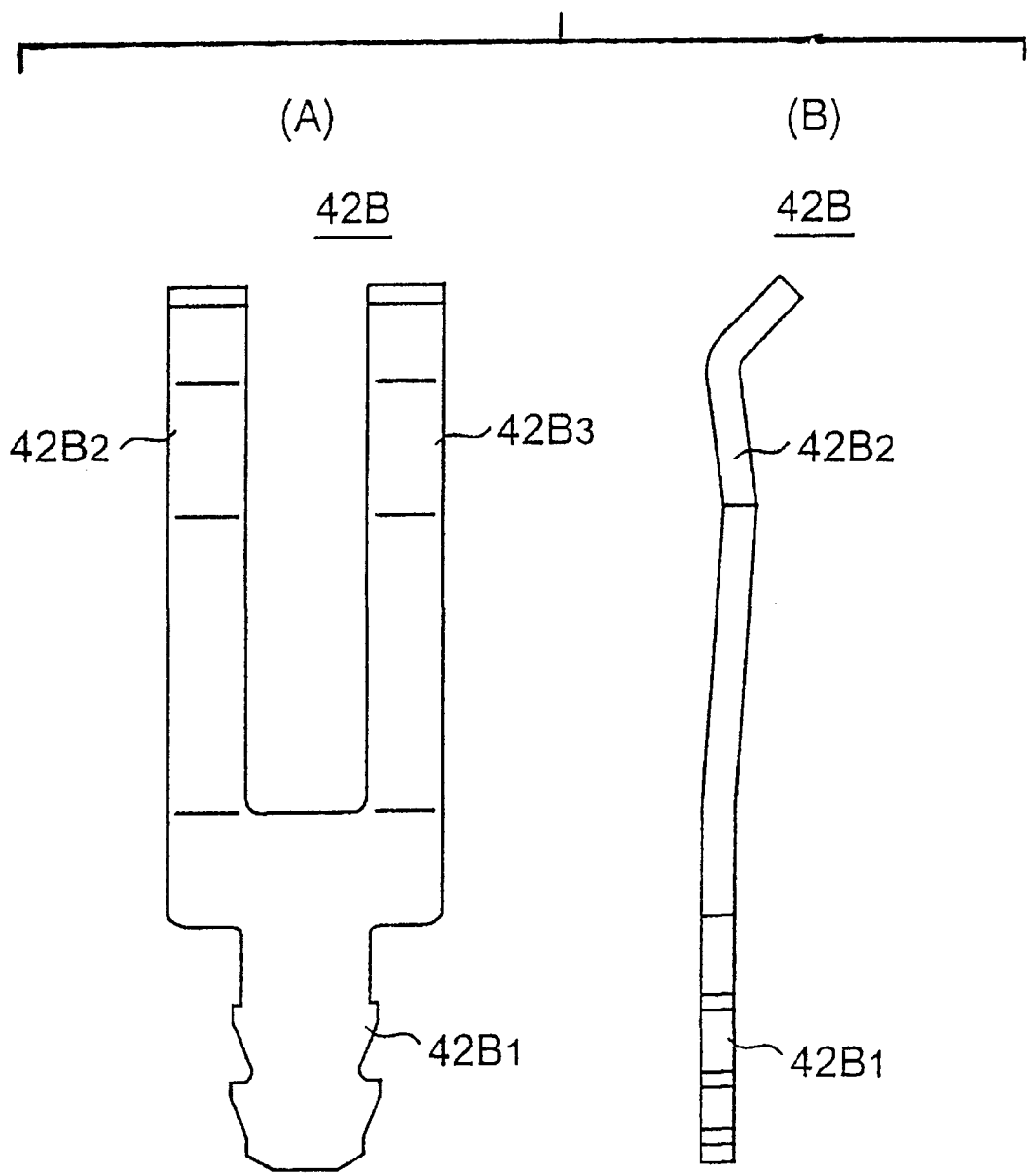
FIG. 8 is a view that shows a structure of a movable section 42B of the eject operation detecting switch 42, (A) is a plan view of the movable section 42B, and (B) is a side view of the movable section 42B.

FIG. 8 is a view that shows a structure of a movable section 42B of the eject operation detecting switch 42, (A) is a plan view of the movable section 42B, and (B) is a side view of the movable section 42B.

As shown in FIGS. 8(A) and (B), the mobile section 42B has a press-fitting part $42B_1$ to be press-fitted into the slider 54 described below and contact parts $42B_2$, $42B_3$ extending in two fork-shapes from the press-fitting part $42B_1$.

As described below, after the memory card 24 is correctly placed in the connector 11 for a memory card, when an eject operation is conducted, the mobile section 42B closes the eject operation detecting switch 42 by contacting the contact parts $42B_2$ and $42B_3$ close to the fixed section 42A with the contact part $42A_3$ of a pair of the fixed sections 42A being kept at the connector pin keeping part 20. Then, an eject operation detecting signal of the eject operation detecting switch 42 is provided to a control circuit (not shown), the control circuit recognizes that the memory card 24 will be ejected, and data writing into the memory card 24 or data reading out from the memory card 24 is stopped.

Therefore, because the eject operation of the memory card 24 is detected by contacting the mobile section 42B provided on the slider member 54 to the fixed section 42A provided on the connector pin keeping part, the connector for a memory card can be small composition rather than providing a micro-switch being sold in the market place in the eject operation of the memory card 24, also the eject operation of the memory card 24 can be miniaturized and reduced thickness the connector for a memory card.

Figure 9:
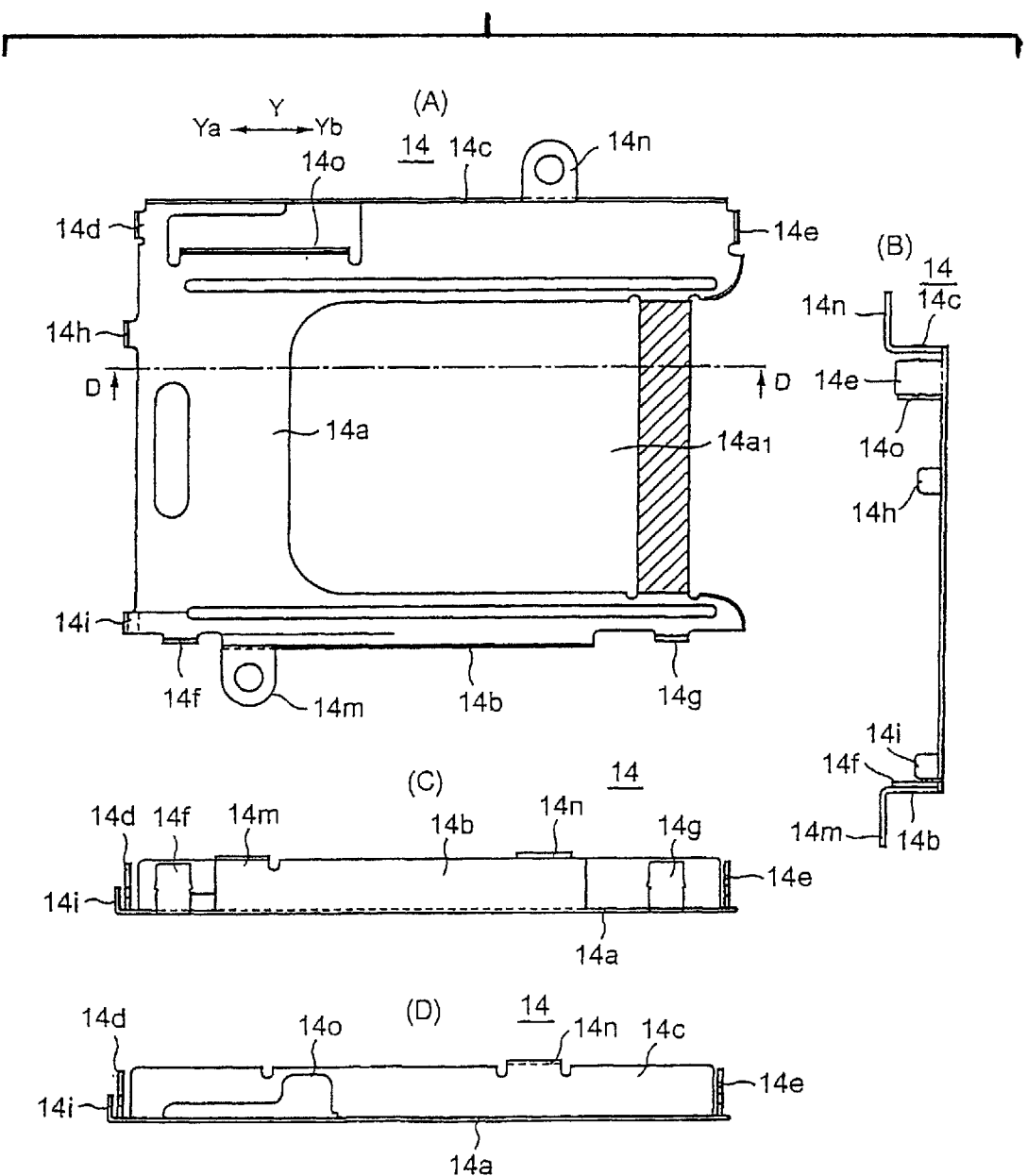
FIG. 9 is a view that shows a structure of a plate 14, (A) is a bottom plan view of the plate 14, (B) is a front view of the plate 14, (C) is a side view of the plate 14, and (D) is a D—D vertical cross section view of the plate 14.

FIG. 9 is a view that shows a structure of a plate 14, (A) is a bottom plan view of the plate 14, (B) is a front view of the plate 14, (C) is a side view of the plate 14, and (D) is a D—D vertical cross section view of the plate 14.

As shown in FIGS. 9(A) through (D), the plate 14 is formed by the pressing of a metal plate, and has a flat plate part 14a facing to the housing 12 and side plates 14b and 14c manufactured with bending at 90 degree from both sides of the flat plate part 14a. Also, a window $14a_1$ is provided so as to show that the memory card 24 is inserted.

Stoppers 14d–14g being press-fitted into the stopper holes 46a–46d of the housing 12 protrude at an under surface of the flat plate part 14a. Also, protruding parts 14h and 14i contacting with the connector pin keeping part 20 of the housing 12 protrude in the plate 14. In addition, not only are the stopper 14d–14g of the plate 14 press-fitted into the stopper hole 46a–46d of the housing 12 but also the protruding part 14h and 14i contact a back surface of the connector pin keeping part 20, and also side plates 14b, 14c contact outer surfaces of the left side part 36 and the right side part 38 so as to be joined with the housing 12.

Also, a fixing part 14m as a screw stopper is provided on the side plate 14b protruding to a right side direction and a fixing part 14n as a screw stopper is provided on the side plate 14c protruding to left side direction. In addition, a restriction part 14o restricting lock operation of the lock mechanism 18 protrudes under a surface of the flat plate part 14a. When the insert position of the memory card 24 is an half lock condition as described below, the restriction part 14o does not restrict a cancellation operation of the lock mechanism 18, and when the insert position of the memory card 24 is a full lock condition, the restriction part 14o operates to restrict a cancellation operation of the lock mechanism 18

Figure 10:
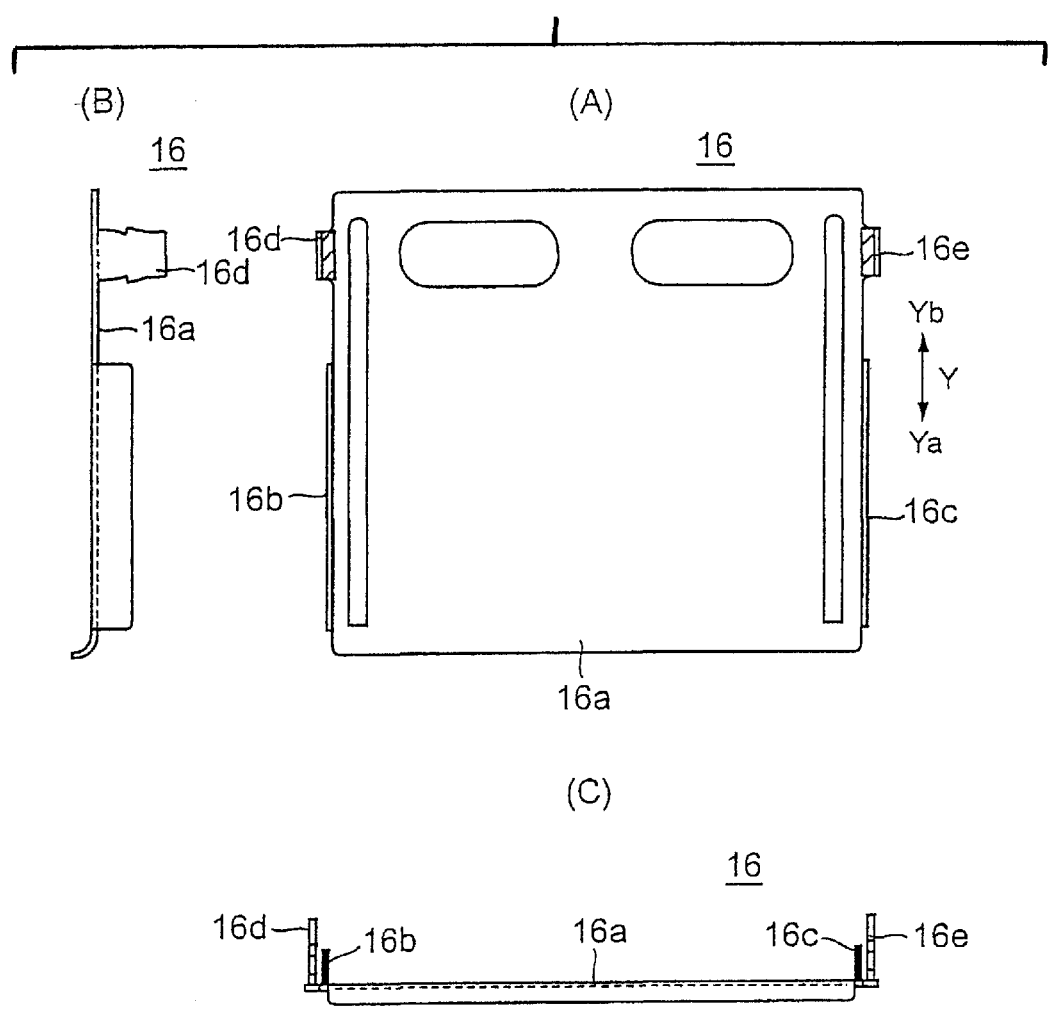
FIG. 10 is a view that shows a structure of a guide plate 16, (A) is a plan view of the guide plate 16, (B) is a side view of the guide plate 16, and (C) is a front view of the guide plate 16.

FIG. 10 is a view that shows a structure of a guide plate 16, (A) is a plan view of the guide plate 16, (B) is a side view of the guide plate 16, and (C) is a front view of the guide plate 16.

AS shown in FIGS. 10(A) through (C), the guide plate 16 is fixed at an entrance of the insertion part 22 of the connector 11 for a memory card so as to guide an insertion of the memory card 24. Also, the guide plate 16 has a flat plate part 16a guiding an insertion of the memory card 24, side plates 16b, 16c to be manufactured with bending to a left and right side surface of the flat plate part 16a, and stoppers 16d, 16e being press-fitted into the stopper holes 46e, 46f being provided on the left side part 36 and the right side part 38 of the housing 12.

Here, a structure of the lock mechanism 18, which is described above, will be explained.

Figure 11:
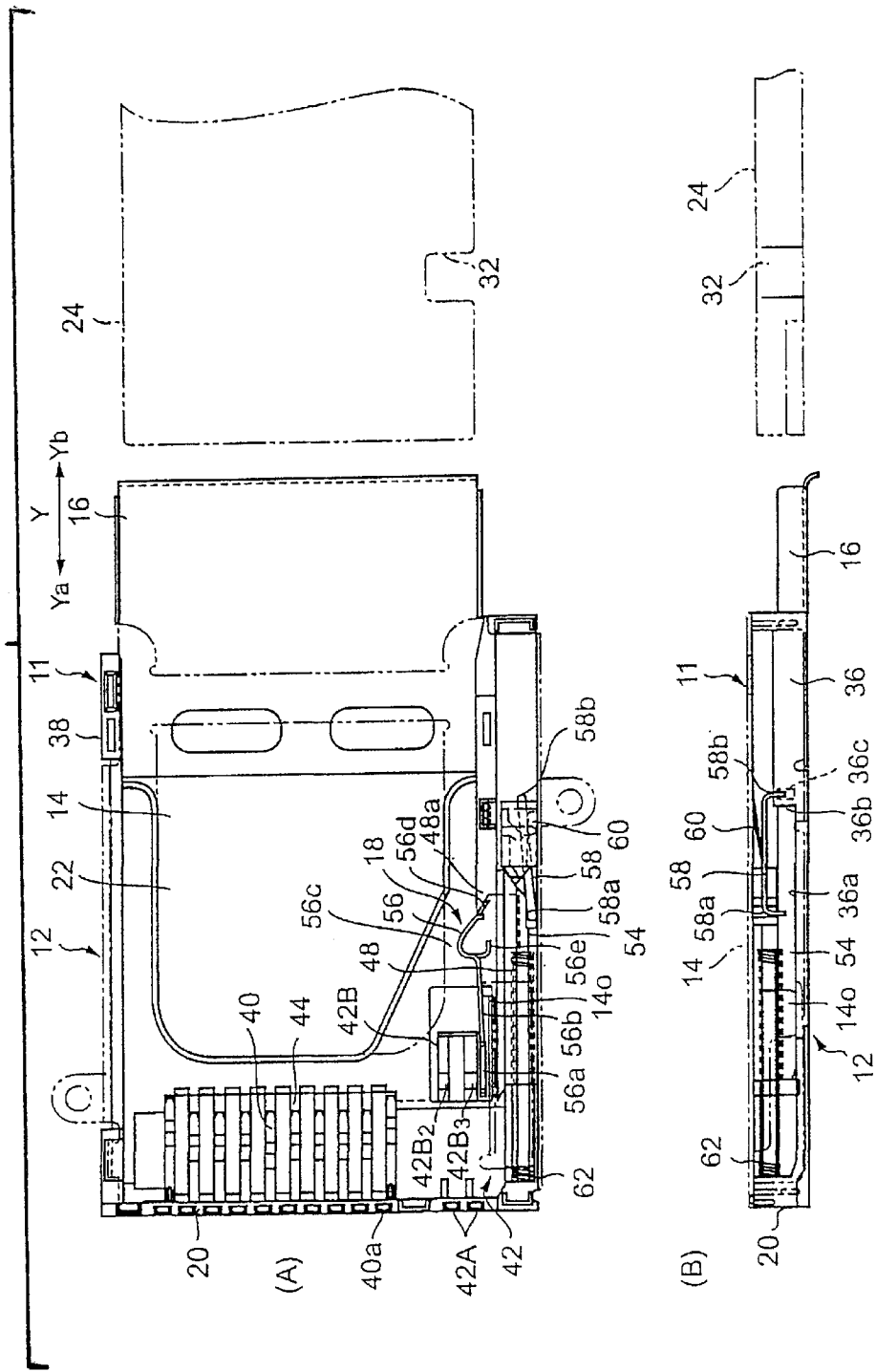
FIG. 11 is a view that shows a state of a connector 11 for a memory card before inserting the memory card 24 thereto, (A) is a plan view of the connector 11 for a memory card, and (B) is a side view of the connector 11 for a memory card.

FIG. 11 is a view that shows a state in which a connector 11 for a memory card before inserting the memory card 24 thereto, (A) is a plan view of the connector 11 for a memory card, and (B) is a side view of the connector 11 for a memory card.

As shown in FIGS. 11(A) and (B), the lock mechanism 18 has the slider (a slider member) 54, a lock member 56 (a press member) to be stopped at the slider 54, a lock pin 58 to be engaged to the slider 54, a plate spring 60 pressing the lock pin 58 to the slider 54 and a coil spring 62 pressing the slider 54 in the eject direction (Yb Direction).

Figure 12:
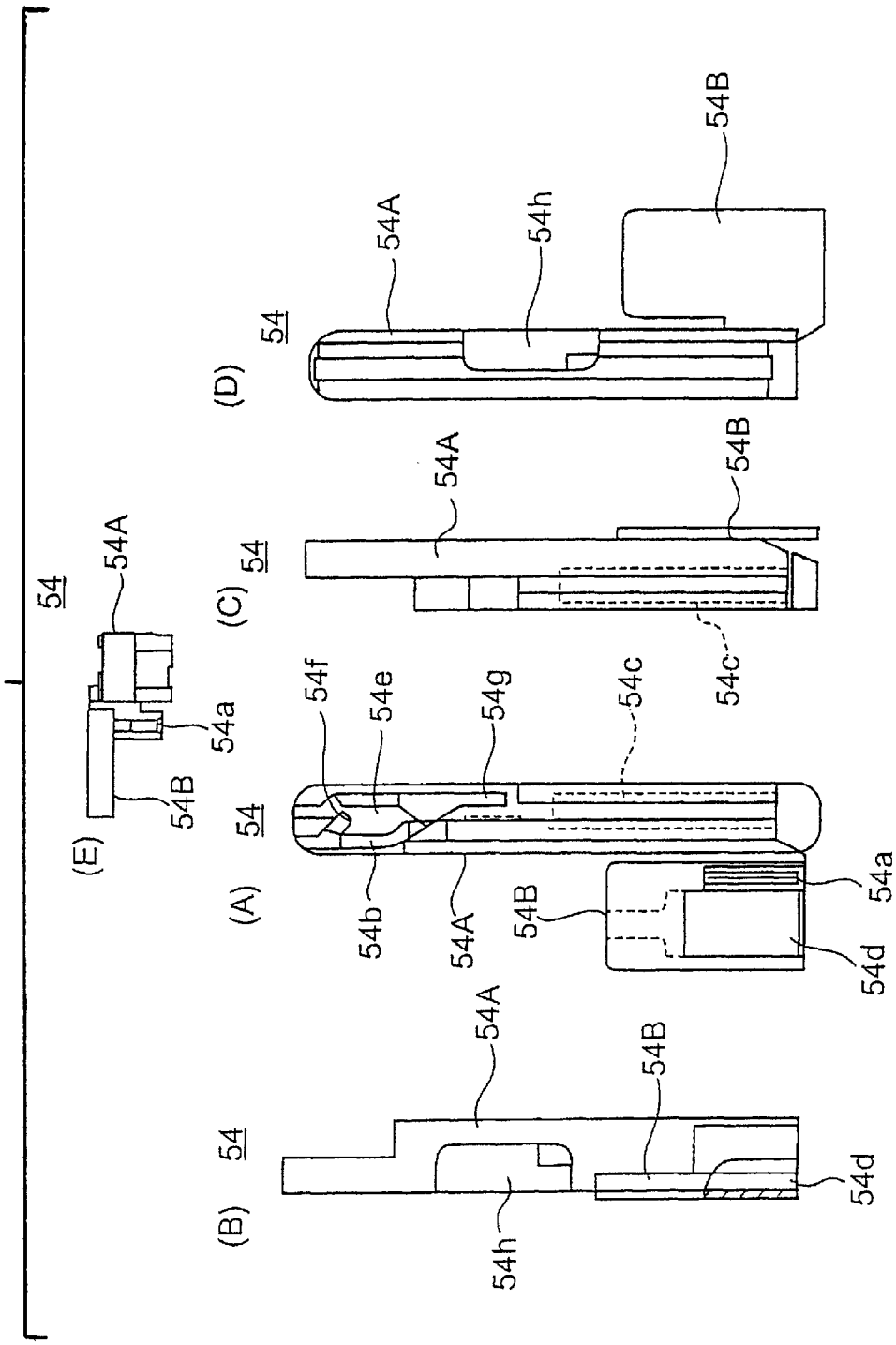
FIG. 12 is a view that shows a structure of a slider 54, (A) is a plan view of the slider 54, (B) is a left side view of the slider 54, (C) is a right side view of the slider 54, (D) is a bottom plan view of the slider 54, and (E) is a rear view of the slider 54.

FIG. 12 is a view that shows a structure of a slider 54, (A) is a plan view of the slider 54, (B) is a left side view of the slider 54, (C) is a right side view of the slider 54, (D) is a bottom plan view of the slider 54, and (E) is a rear view of the slider 54.

As shown in FIGS. 12(A) through (E), the slider 54 comprises a slide part 54A extending in the inserting direction of a card (Ya direction) and a protruded part 54B protruding from a side of the slider part 54A to the insertion part 22, and formed as one. Also, the slider 54 has a concavity 54a in which a fitting part 56a of the lock member 56 provided on the protruded part 54B fits, an engagement slot 54b in which a tip 58a of the lock pin 58 to be formed as a square shape that misses a left vertical line being provided around a front tip of the slider part 54A, a spring inserting hole 54c to be inserted the coil spring 62 being provided inside of a back tip of the slider part 54A, and a press-fitted hole 54d to be press-fitted the press-fitting part 42B₁ of the mobile section 42B to be provided on the protruded part 54B.

The engagement slot 54b is formed surrounding a heart shaped cum 54e. Then, along with an inserting operation of the memory card 24, the tip 58a of the lock pin 58 slides with tracing the periphery of the heart shaped cum 54e so as to keep the lock member 56 at the full lock position in that the tip 58a of the lock pin 58 is stopped at a concavity 54f of the heart shaped cum 54e. Also, when the full lock condition is cancelled out, the slider 54 slides in the eject direction (Yb direction) pushed by a spring force of a coil spring 62 and the tip 58a of the lock pin 58 passes though the engagement slot 54b and moves to an escape slot 54g, then ejects the memory card 24 to the position as before inserting.

Also, when the memory card 24 is inserted, because the lock pin 58 can slide as a pole with one tip 58b, so the slider 54 can be stopped at a position moved in an insertion direction (Ya direction) in that the tip 58a is stopped at the concavity 54f of the heart shaped cum 54e. When the memory card 24 is ejected, it is possible to move the slider 54 to the eject direction (Yb direction) in that the tip 58a passes by the periphery of the heart shaped cum 54e and fits to the escape slot 54g.

Also, an escape part 54h that can cancel a lock to the memory card 24 as the lock member 56 of a side surface displaces to the outside is provided on the slider 54.

Figure 13:
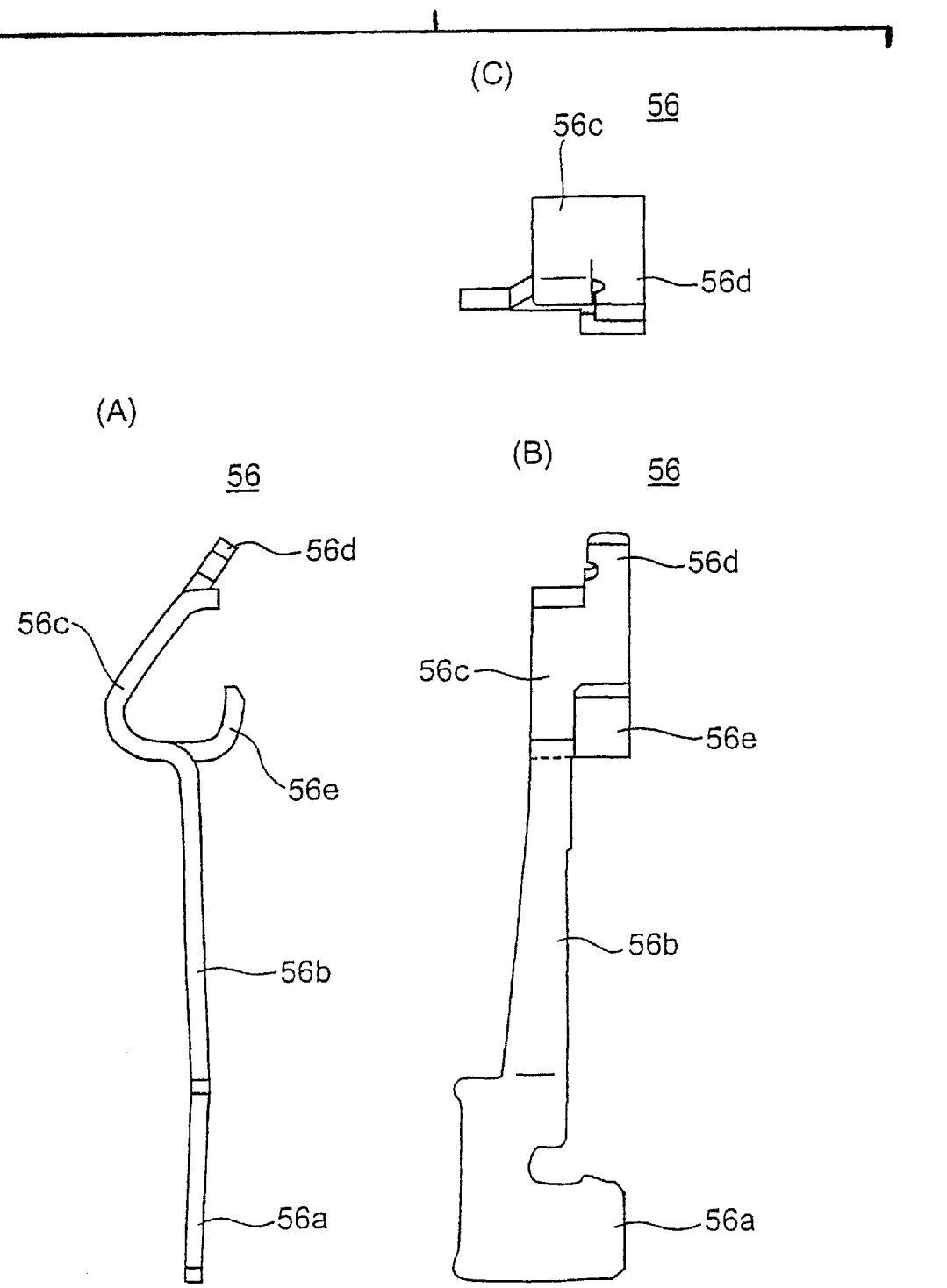
FIG. 13 is a view that shows a structure of a lock member 56, (A) is a plan view of the lock member 56, (B) is a side view of the lock member 56, and (C) is a rear view of the lock member 56.

FIG. 13 is a view that shows a structure of a lock member 56, (A) is a plan view of the lock member 56, (B) is a side view of the lock member 56, and (C) is a rear view of the lock member 56.

As shown in FIGS. 13(A) through (C), the lock member 56 is manufactured by bending a metal plate spring, and has a fitting part 56a to be fit-stopped at a concavity 54a of the slider 54, an arm 56b extending from the fitting part 56a to the eject direction (Yb direction), a card stopper 56c being curved from a tip of the arm 56b to a side of the insertion part 22, a protruded part 56d protruding from under a part of the card stopper 56c to a tip side further, and a stopper part 56e manufactured with bending so as to protrude from a tip of the arm 56b to an opposite side of the insertion part 22.

When the memory card 24 is inserted into the insertion part 22 as described below, a slide part of the card stopper 56c directly contacts with a tip of the memory card 24, then the card stopper 56c displaces to the outside so as to permit an insertion of the memory card 24, and when the memory card 24 is further inserted in the Ya direction, the card stopper 56c fits to the concavity 32 and makes the memory card 24 stop. Also, when the memory card 24 is inserted into the insertion part 22, not only the card stopper 56c displaces to a side direction of the insertion part 22 so as to permit an insertion of the memory card 24 but also the lock member 56 guides the inserting operation by pressing the side surface of the memory card 24. Thus, the card stopper 56c being fitted to the concavity 32 presses the memory card 24 to the side of the insertion part 22, so that a jolt of the memory card 24 is prevented.

Also, when the memory card 24 is inserted into the insertion part 22 in a wrong direction (for example, inserted in an opposite direction), in the card stopper 56c, the lock member 56 can be displaced to the outside, but after sliding in the Ya direction with lock member 56 displaced, the stopper 56e contacts with the restriction part 14o of the plate 14 and the memory card 24, then the memory card 24 can not be inserted any more. As described above, the lock member 56 has also a prevention capability for wrong insertion of the memory card 24, and completely prevents an insertion of the memory card 24 in a wrong different direction.

Also, when a slide position of the slider 54 is at the full lock position, the stopper 56e directly contacts with the restriction part 14o of the plate 14 so as to be restricted from displacement in a cancel direction of the lock (a direction in which the card stopper 56c is separated from the concavity 32 of the memory card 24).

Here, an inserting operation of the memory card 24 will be explained step by step.

Figure 14:
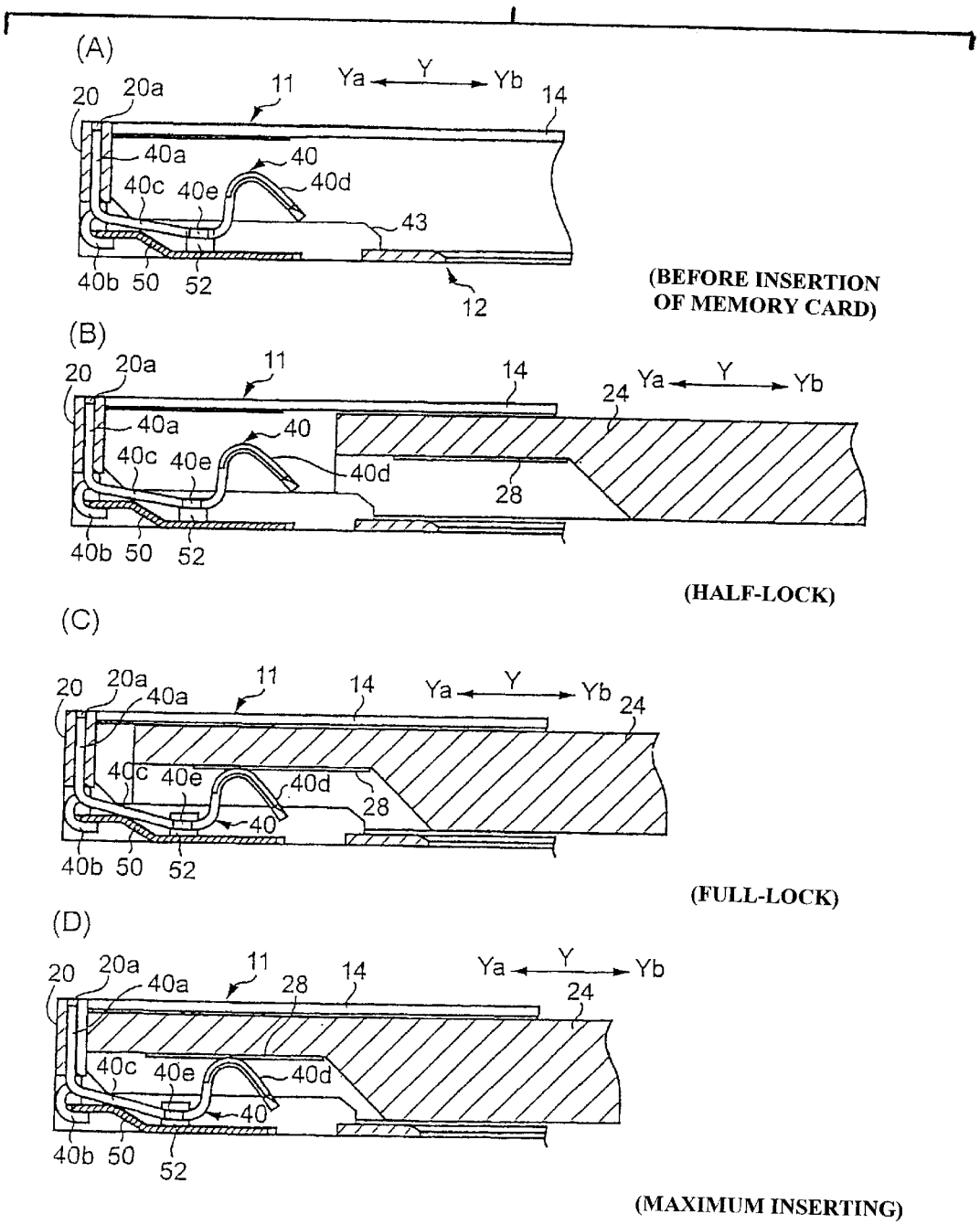
FIG. 14 is a view that shows an inserting position of the memory card 24, (A) is a side section view of a state of the memory card 24 before inserting, (B) is a side sectional view of a state of a half-lock of the memory card 24 after inserting, (C) is a side sectional view of a state of a full-lock of the memory card 24 after inserting, and (D) is a side section view of a state to be inserted where the memory card 24 is inserted into a maximum inserting position.

FIG. 14 is a view that shows an inserting position of the memory card 24, (A) is a side section view of a state of the memory card 24 before inserting, (B) is a side sectional view of a state of a half-lock of the memory card 24 after inserting, (C) is a side sectional view of a state of a full-lock of the memory card 24 after inserting, and (D) is a side section view of a state to be inserted where the memory card 24 is inserted into a maximum inserting position.

As shown in FIG. 14(A), a contact part 40d of the connector pin 40 protrudes in the insertion part 22 before the memory card 24 is inserted into the insertion part 22 of the connector 11 for a memory card.

As shown in FIG. 14(B), when the memory card 24 is inserted into the insertion part 22 of the connector 11 for a memory card and reaches the half-lock position, the concavity 32 is stopped by the lock member 56 of the lock mechanism 18 as described below. At this time, the connector pin 28 of the memory card 24 does not contact the contact part 40d of the connector pin 40. Also, because a displacement of the lock member 56 to the cancel direction of the lock is not restricted (a direction which the card stopper 56c is separated from the concavity 32 of the memory card 24), when a pulling out force of the memory card 24 operates to the eject direction (Yb direction), the card stopper 56c displaces to the direction which is separated from the concavity 32 of the memory card 24 then a stopper according to the lock member 56 is released so as to be able to pull out the memory card 24.

As shown in FIG. 14(C), when the memory card 24 is inserted into at full-lock position, the connector pin 28 of the memory card 24 contacts with the contact part 40d of the connector pin 40 then presses down the contact part 40d of the connector pin 40. Accordingly, a placing operation of the memory card 24 is done and read and write of a plurality of data can be attained. At this stage, the displacement of the stopper 56e of the lock member 56 to the cancel direction of the lock is restricted by the restriction part 14o of the plate 14, the card stopper 56c creates a card locked state which prevents displacement to a direction being separated from the concavity 32 of the memory card 24, then the memory card 24 can not be pulled out.

As shown in FIG. 14(D), when the memory card 24 is further pushed in the inserting direction (Ya direction) and moved to the maximum inserted position, the connector pin 28 of the memory card 24 maintains contact with the contact part 40d of the connector pin 40 as described below, the eject operation detecting switch 42 is turned on and an eject operation detecting signal will be outputted.

Now, an operation of the lock mechanism 18 as composed above will be explained with an insert operation of the memory card 24 with reference to FIG. 11 and FIGS. 15–17.

Figure 15:
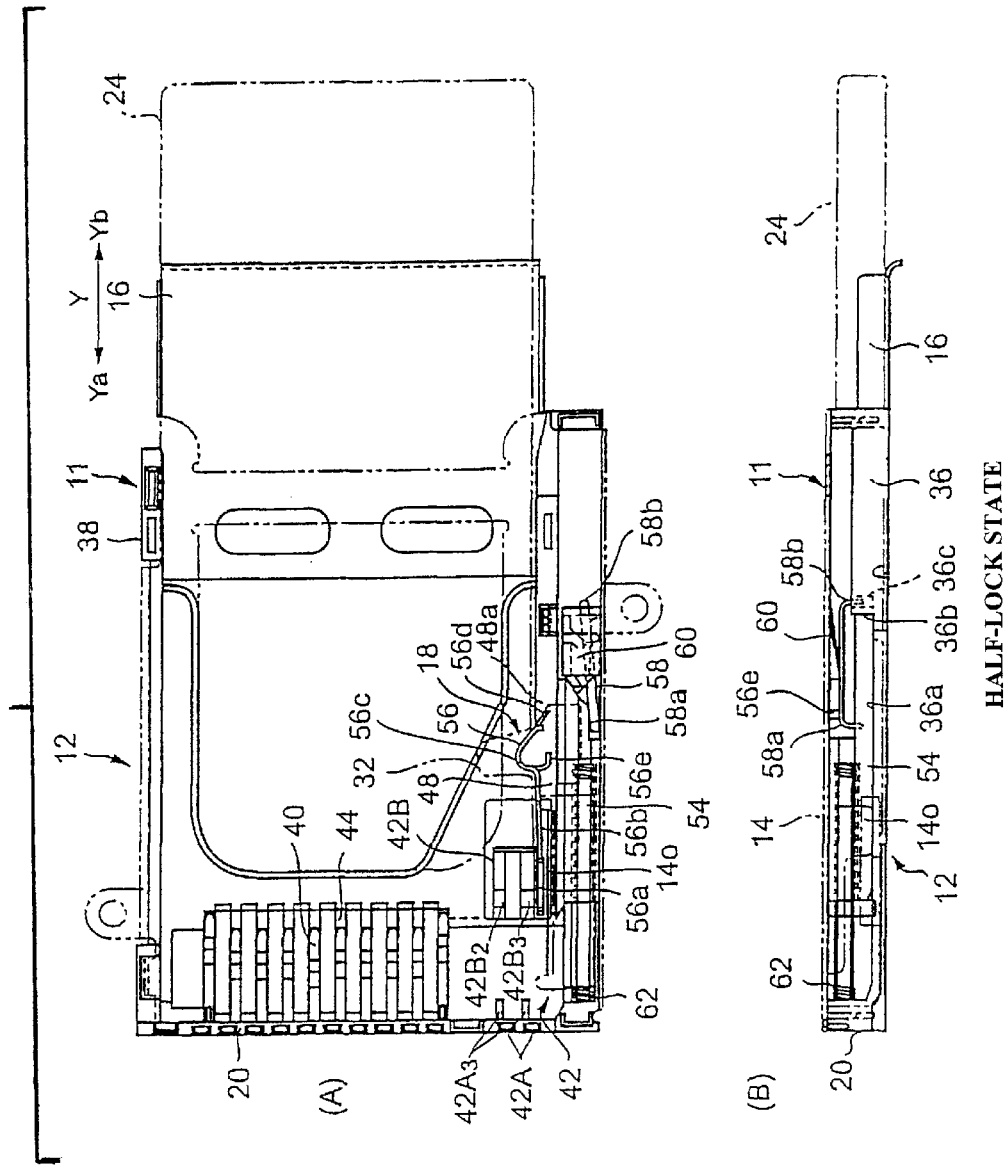
FIG. 15 is a view that shows a state of the connector 11 for a memory card where the memory card 24 is inserted at the half-lock position, (A) is a plan view of the connector 11 for a memory card, and (B) is a side view of the connector 11 for a memory card.
Figure 16:
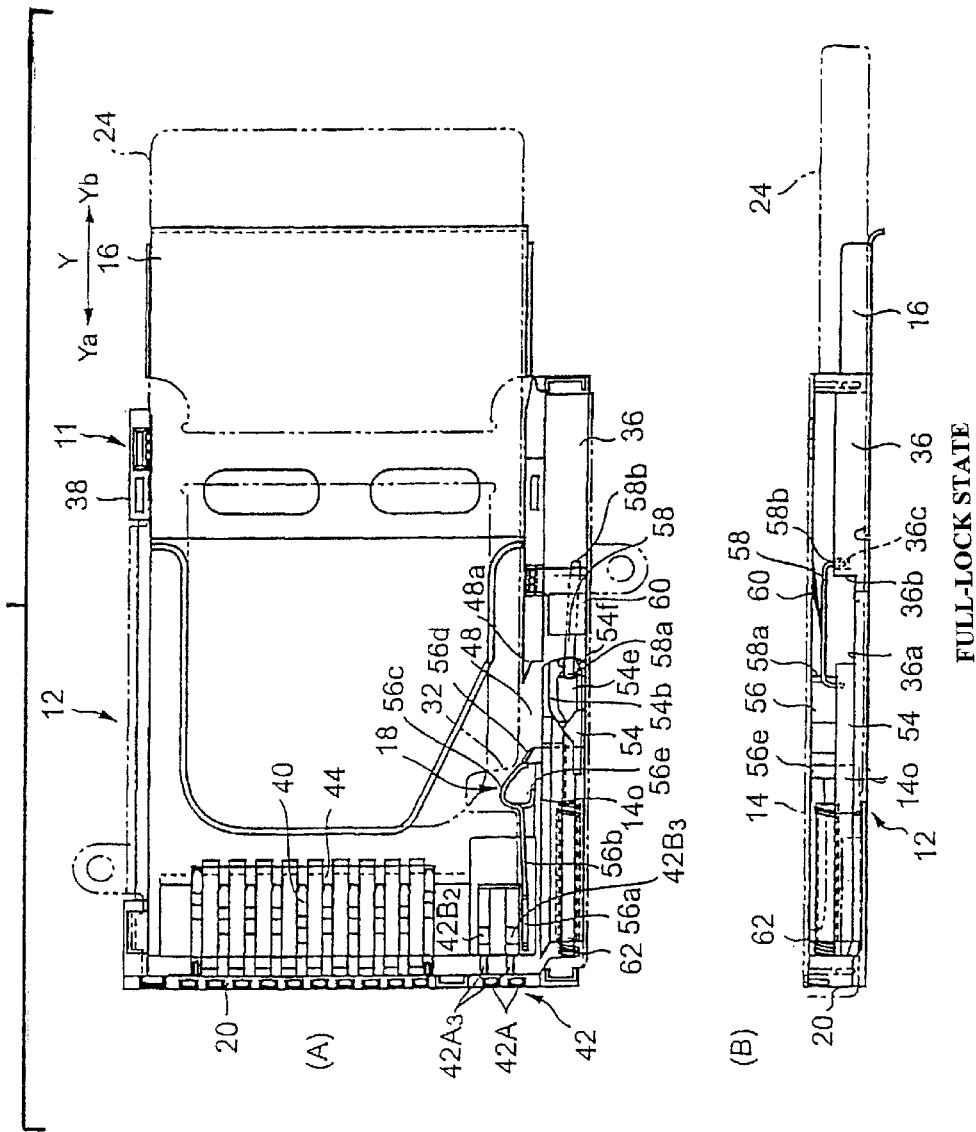
FIG. 16 is a view that shows a state of the connector 11 for a memory card where the memory card 24 is inserted at the full-lock position, (A) is a plan view of the connector 11 for a memory card, and (B) is a side view of the connector 11 for a memory card.
Figure 17:
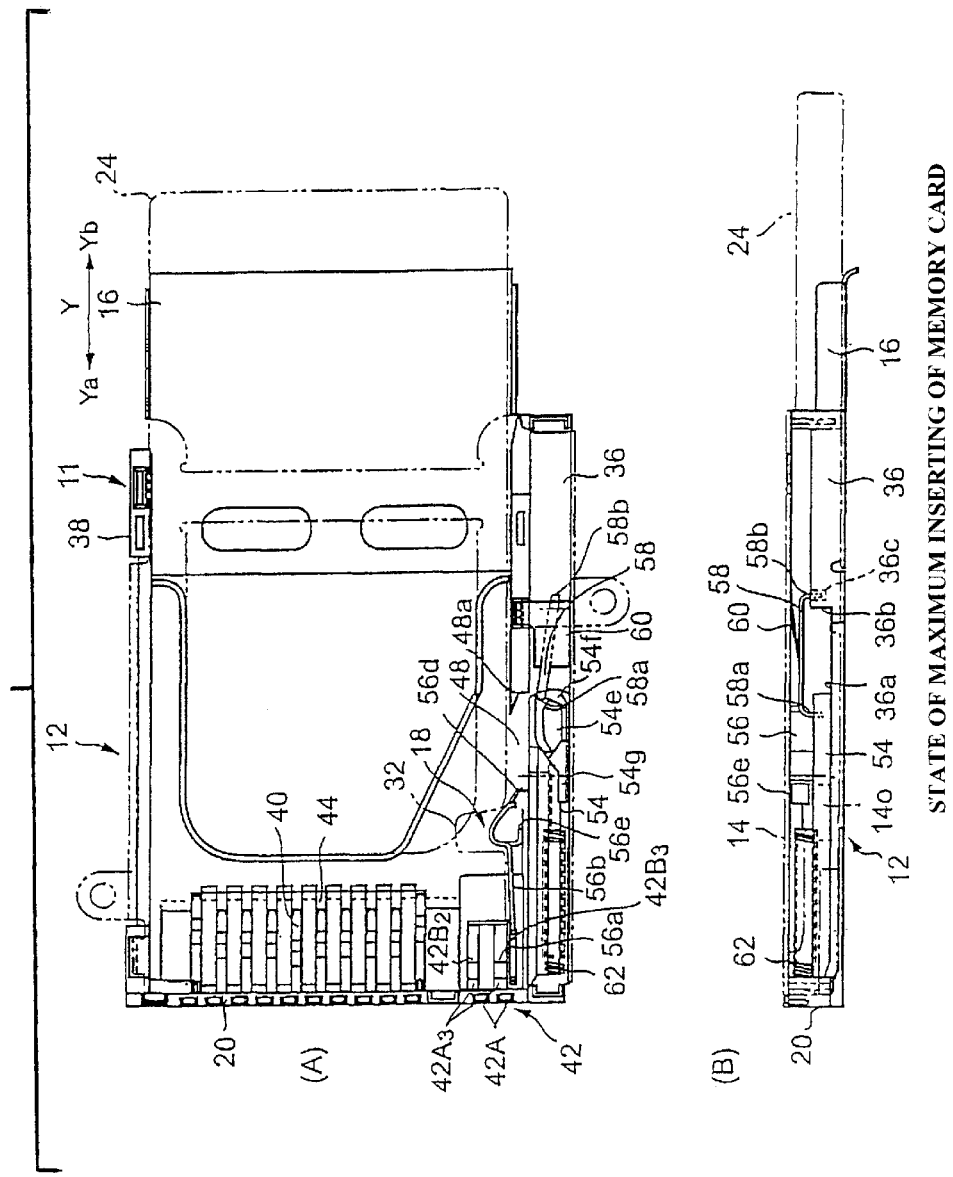
FIG. 17 is a view that shows a state of the connector 11 for a memory card where the memory card 24 is inserted at the maximum inserting position, (A) is a plan view of the connector 11 for a memory card, and (B) is a side view of the connector 11 for a memory card.

FIG. 15 is a view that shows a state of the connector 11 for a memory card where the memory card 24 is inserted at the half-lock position, (A) is a plan view of the connector 11 for a memory card, and (B) is a side view of the connector 11 for a memory card. FIG. 16 is a view which shows a state of the connector 11 for a memory card where the memory card 24 is inserted at the full-lock position, (A) is a plan view of the connector 11 for a memory card, and (B) is a side view of the connector 11 for a memory card. FIG. 17 is a view which shows a state of the connector 11 for a memory card where the memory card 24 is inserted at the maximum inserting position, (A) is a plan view of the connector 11 for a memory card, and (B) is a side view of the connector 11 for a memory card.

A State Before an Insertion of a Memory Card.

As shown in FIGS. 11(A) and (B), in the connector 11 for a memory card before inserting the memory card 24, the slider 54 moves to the eject direction (Yb direction) by a spring force of the coil spring 62 and directly contacts with the step 36b of the housing 12, then the lock member 56 makes the card stopper 56c protrude to a side of the insertion part 22, and the protruded part 56d is stopped at the stopper 48a of the concavity 48 provided on the housing 12. Also, the tip 58a of the lock pin 58 fits into the escape slot 54g of the slider 54.

A State of the Half-Lock of a Memory Card

As shown in FIGS. 15(A) and (B), when the memory card 24 is inserted into the insertion part 22 of the connector 11 for a memory card and reaches the half-lock position, the memory card 24 is stopped by the lock member 56 of the lock mechanism 18. That is, the lock member 56 stops the memory card 24 at the half-lock state in that the lock member 56 makes the card stopper 56c fit into the concavity 32 of the memory card 24 when the memory card 24 is inserted at the half-lock position.

At this stage, the stopper 56e of the lock member 56 is not facing to the restriction part 14o of the plate 14, but faces to the concavity 48 provided on the left side part 36 of the housing 12, and the lock can be released by displacing to an outside direction in order to go into the concavity 48. In addition, in a process of insertion of the memory card 24 into the insertion part 22, the lock member 56 permits an insertion of the memory card 24 by displacing of the card stopper 56c to a side direction of the insertion part 22, also the lock member 56 guides an inserting operation by pressing a side surface of the memory card 24.

Also, the tip 58a of the lock pin 58 is fitted into the escape slot 54g of the slider 54, and the connector pin 28 of the memory card 24 is not contacted with the contact part 40d of the connector pin 40 (See FIG. 14B).

A State of Full-Lock of a Memory Card

As shown in FIGS. 16(A) and (B), when the memory card 24 is further pressed into an insertion direction (Ya direction) from the half-lock position, the slider 54 moves to the inserting direction (Ya direction) with the memory card 24. Thus, the memory card 24 is pressed into a side of the insertion part 22 by the card stopper 56c to be fitted to the concavity 32, and the memory card 24 is inserted smoothly while being kept a state without a jolt.

When the slider 54 moves to the inserting direction (Ya direction), the lock pin 58 keeps the slider 54 at a moving position of the inserting direction (Ya direction) by that the tip 58a of the lock pin 58 engages to the concavity 54f of the heart cum 54e provided on the slider 54. That is, the slider 54 is energized by the coil spring 62 in the eject direction (Yb direction), but the slider 54 is stopped at full-lock position shown in FIGS. 16A and B in that the concavity 54f contacts with the tip 58a of the lock pin 58.

Accordingly, the connector pin 28 of the memory card 24 contacts with the contact part 40d of the connector pin 40, and the stopper 56e of the lock member 56 moves to a position facing the restriction part 14o of the plate 14. Thus, the lock member 56 can not displace to the cancel direction of the lock (a direction which the card stopper 56c is separated from the concavity 32 of the memory card 24) and keeps a lock state because the stopper 56e directly contacts with the restriction part 14o of the plate 14. Therefore, in the full-lock state, the card stopper 56c of the lock member 56 makes the memory card 24 securely locked being fitted to the concavity 32 of the memory card 24, even in case of an attempt at pulling out the memory card 24.

A Maximum Inserted State of a Memory Card (a State of an Ejecting Operation)

As shown in FIGS. 17(A) and (B), when the memory card 24 is further pressed into the inserting direction (Ya direction) from the full-lock position and moved to the maximum inserting position, the tip 58 of the lock pin 58 cancels a stopper for the slider 54 by moving to the engagement slot 54b separated from the concavity 54f of the heart cum 54e provided on the slider 54. Simultaneously, the mobile section 42B provided on the slider 54 contacts with the fixed section 42A fixed on the connector pin keeping part 20 while the connector pin 28 of the memory card 24 is contacting by the contact part 40d. As described above, the eject operation detecting signal will be outputted by turning on the eject operation detecting switch 42.

Accordingly, a control circuit not only recognizes that the eject operation of the memory card 24 is being performed but also can stop writing data into the memory card 24 and reading out data from the memory card 24.

Also, the slider 54 moves to the ejecting direction (Yb direction) by a spring force of the coil spring 62 because a moving control in the ejecting direction by the lock pin 58 is cancelled out. At this stage, the memory card 24 moves in the ejecting direction (Yb direction) with the slider 54 by pushing a tip of the memory card 24 by the protruded part 52B of the slider 54.

By doing so, the connector pin 28 of the memory card 24 separates from the contact part 40d of the connector pin 40. Also, when the memory card 24 is ejected at half-lock position shown in FIGS. 15A and B, an ejection of the memory card 24 is possible due to a rear tip part protruding from the guide plate 16. In addition, because the lock member 56 separates from the restriction part 14o of the plate 14 and moves to a place facing the concavity 48 provided at the left side part 36 of the housing 12, a control by the restriction part 14o is cancelled out. Thus, when the memory card 24 is pulled out in the ejecting direction (Yb direction), the card stopper 56c of the lock member 56 separates from the concavity 32 by displacing in the cancel direction of the lock. Because of this, the memory card 24 can be ejected out by canceling the lock out against the memory card 24 due to the lock member 56.

Figure 18:
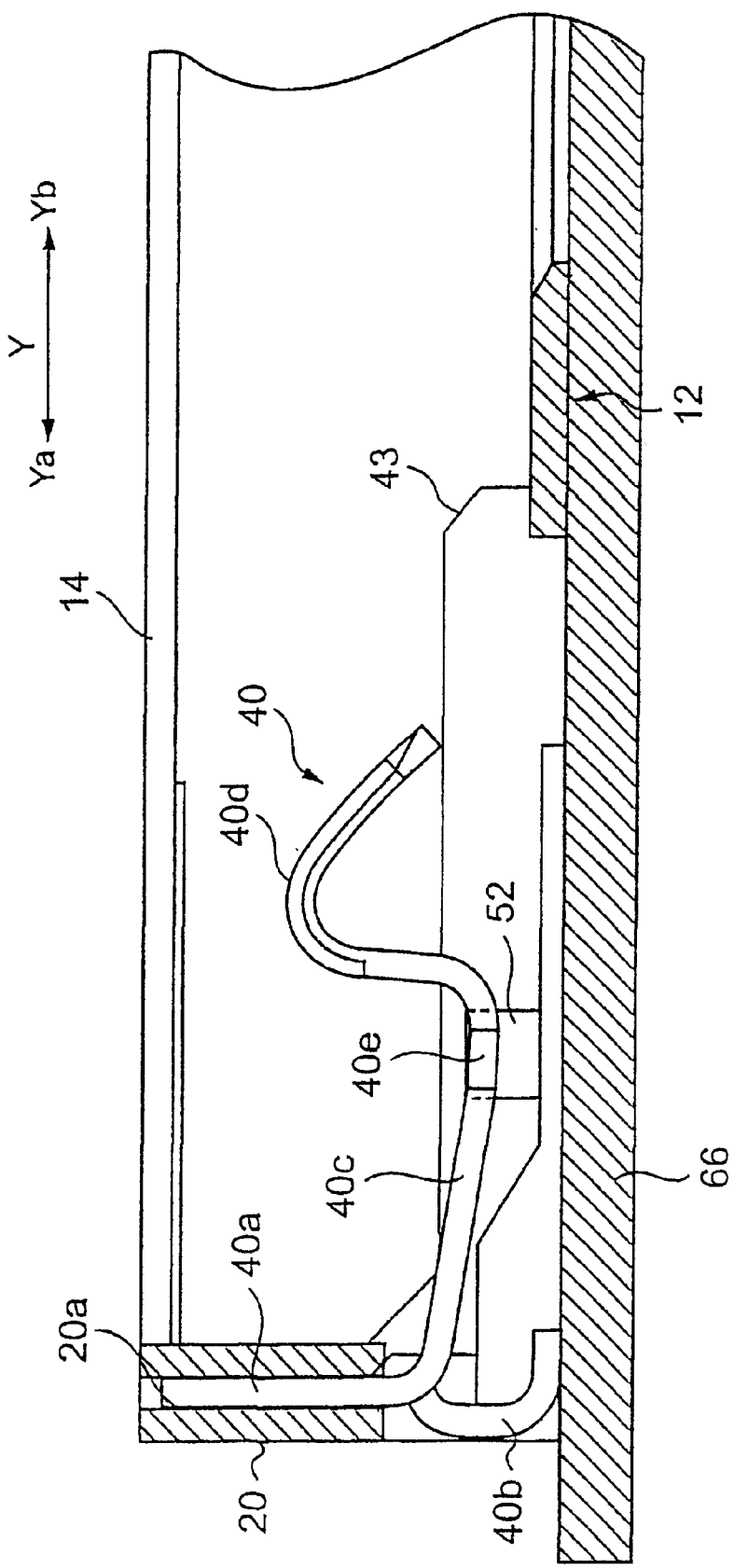
FIG. 18 is a vertical cross section side view of alternative embodiment of the connector pin 40.

FIG. 18 is a vertical cross section side view of an alternative arrangement of the connector pin 40.

As shown in FIG. 18, the connector pin 40 attached at the fixing hole 20a of the connector pin keeping part 20 is formed as protruding to below and further long in order to that the substrate connector 40b can be soldered not to the above mentioned flexible line plate 50 but a hard substrate 66. Therefore, the substrate connector 40b of the connector pin 40 can be soldered without any problems even when the housing 12 is placed on the hard substrate 66.

Further, as an example, the above embodiment explains the memory card 24 of such a formation as shown in FIG. 2, but the present invention is not limited the above embodiment, and the present invention is applicable to a memory card with any formation besides above embodiment.

What is claimed is:

1. A connector for a memory card, comprising:

a housing forming an insertion part into which said memory card is inserted;

a contact terminal that is formed inside said housing and formed to extend in an inserting direction so as to contact a terminal of said memory card;

a press member that fits in a concavity formed on a side surface of said memory card when said memory card is inserted in said insertion part, wherein said press member comprises:
    a fitting part being fittingly engaged with a slider member sliding in the inserting direction by an insertion of said memory card;
    an arm extending in an ejecting direction from said fitting part;
    an engagement part that is formed to curve toward a side of said insertion part from an end of said arm so as to fit in a concavity formed in a side surface of said memory card;
    a stopper that is formed to protrude toward an opposite side of said insertion part from a tip of said arm and slides in the inserting direction with insertion of said memory card so as to contact said restriction member so that a movement in an engagement releasing direction is restricted; and a restriction member that restricts said press member moving away from said concavity of said memory card by directly contacting said press member when said memory card is inserted to a loaded position where said terminal of said memory card is brought into contact with said contact terminal.

2. The connector for a memory card as claimed in claim 1, characterized in that said press member moves to a side of said insertion part so as to permit an insertion of said memory card and also guide an inserting operation by pushing a side surface of said memory card when said memory card is inserted in said insertion part.

3. The connector for a memory card as claimed in claim 2, characterized in that said press member is made from a board spring, said engagement part is fitted in the concavity formed on a side surface of said memory card by elastic deformation of said arm due to the inserting operation of said memory card, and moves in the inserting direction with said slider member.

4. The connector for a memory card as claimed in claim 2, characterized in that said press member slides in the inserting direction, when said memory card is inserted in said insertion part with wrong direction, due to said engagement part directly contacting an insertion side end of the inserted memory card, thereby said stopper is prevented from being inserted.

* * * * *